US006333492B1

(12) United States Patent
Graves et al.

(10) Patent No.: US 6,333,492 B1
(45) Date of Patent: Dec. 25, 2001

(54) THERMAL COMPENSATION FOR VISIBLE LIGHT COOKING OVEN

(75) Inventors: Todd Vincent Graves, Louisville; Charles Ray Smith, Shelbyville; Kevin Farrelly Nolan, Shepherdsville, all of KY (US)

(73) Assignee: General Electric Company, Louisville, KY (US)

( * ) Notice: Subject to any disclaimer, the term of this patent is extended or adjusted under 35 U.S.C. 154(b) by 0 days.

(21) Appl. No.: 09/540,834

(22) Filed: Mar. 31, 2000

Related U.S. Application Data

(63) Continuation-in-part of application No. 09/481,064, filed on Jan. 11, 2000.
(60) Provisional application No. 60/126,885, filed on Mar. 30, 1999.

(51) Int. Cl.[7] ................................ H05B 1/02; A21B 1/40

(52) U.S. Cl. .......................... 219/413; 219/411; 219/486; 219/492; 219/508; 219/685

(58) Field of Search .................................... 219/411, 413, 219/486, 492, 497, 508, 685

(56) References Cited

U.S. PATENT DOCUMENTS

| | | | | |
|---|---|---|---|---|
| Re. 36,724 | * | 6/2000 | Westerberg et al. | 219/685 |
| 4,238,995 | * | 12/1980 | Polster | 219/411 |
| 4,396,817 | * | 8/1983 | Eck et al. | 219/685 |
| 5,317,130 | * | 5/1994 | Burkett et al. | 219/497 |
| 5,352,865 | * | 10/1994 | Burkett et al. | 219/486 |
| 5,528,018 | * | 6/1996 | Burkett et al. | 219/506 |
| 5,596,514 | * | 1/1997 | Maher, Jr. et al. | 99/325 |
| 5,695,669 | | 12/1997 | Westerberg | 219/411 |
| 5,726,423 | * | 3/1998 | Westerberg et al. | 219/411 |
| 5,883,362 | | 3/1999 | Pettibone et al. | 219/411 |

* cited by examiner

*Primary Examiner*—Joseph Pelham
(74) *Attorney, Agent, or Firm*—H. Neil Houser; George L. Rideout, Jr.

(57) ABSTRACT

A thermal compensation system for an oven including at least one visible light cooking element includes a thermistor in thermal communication with an oven cavity, and a microcomputer coupled to the thermistor and operatively connected to the cooking element from control thereof. When the oven cavity temperature exceeds a minimum threshold prior to cooking operation, the microcomputer reduces a power level of the cooking unit to compensate for latent heat in the oven cavity and avoid overcooking the food.

23 Claims, 16 Drawing Sheets

THERMAL COMPENSATION FOR VISIBLE LIGHT COOKING OVEN

CROSS REFERENCE TO RELATED APPLICATIONS

This application is a continuation-in-part of U.S. application Ser. No. 09/481,064, filed Jan. 11, 2000, which claims the benefit of U.S. Provisional Application No. 60/126,885 filed Mar. 30, 1999.

BACKGROUND OF THE INVENTION

This invention relates generally to ovens with visible light cooking elements and, more particularly, to a combination oven using both radiant and microwave energy.

Ovens using visible light cooking elements, i.e., radiant cooking lamps, energize one or more visible light cooking elements according to pre-selected control algorithms to deliver a sufficient amount of energy to cook selected food. However, on occasion an oven cavity is preheated from prior cooking. When the temperature of the oven cavity reaches a certain threshold, latent heat in the oven cavity imparts additional energy to the food. When thermal energy from the pre-heated oven cavity is combined with the radiant energy of the lamps, food can be overcooked.

Another type of oven includes both radiant cooking elements and a magnetron, or microwave, cooking element. The cooking elements and magnetron are controlled to provide reduced cooking time as compared to known radiant ovens, yet a wide variety of foods can be cooked in such ovens. One such combination oven is operable in a speed cooking mode wherein both radiant and microwave cooking elements are utilized, in a microwave only cooking mode wherein only the magnetron is utilized for cooking, and a radiant only cooking mode wherein only the lamps are utilized for cooking. In such an oven, while the magnetron cooking is generally unaffected by temperature conditions of the oven cavity prior to cooking, thermal energy in the oven cavity prior to cooking can negatively affect the radiant cooking cycles and overcook the food.

Compensation for thermal variation of the oven cavity must be provided in order to provide acceptable cooking results.

BRIEF SUMMARY OF THE INVENTION

In an exemplary embodiment of the invention, an oven includes a cooking cavity, a microcomputer, at least one radiant cooking unit, and a thermistor in thermal communication with the cooking cavity. The thermistor is coupled to the microcomputer which is, in turn, operatively coupled to the radiant cooking unit for delivering a selected amount of cooking energy into the cooking cavity. In response to an input from the thermistor prior to a cooking operation, the microcomputer operates the radiant cooking unit in accordance with a selected cooking time and selected cooking power level and adjusts operation of the radiant cooking unit when a temperature of the cooking cavity exceeds a first threshold.

More specifically, the microcomputer includes a memory loaded with predetermined power level reduction values for the radiant cooking unit according to a selected cooking time and a thermistor temperature reading. Therefore, the power level of the radiant cooking unit is reduced to compensate for latent heat in the oven cavity and to avoid overcooking of food.

DETAILED DESCRIPTION OF THE INVENTION

The present invention is directed, in one aspect, to operation of an oven that includes at least two types of cooking elements, such as radiant and microwave cooking elements. Although one specific embodiment of a radiant/microwave cooking oven is described below, it should be understood that the present invention can be utilized in combination with many other such ovens and is not limited to practice with the oven described herein. For example, the oven described below is an over the range type oven. The present invention, however, is not limited to practice with just over the range type ovens and can be used with many other types of ovens.

Figure 1:
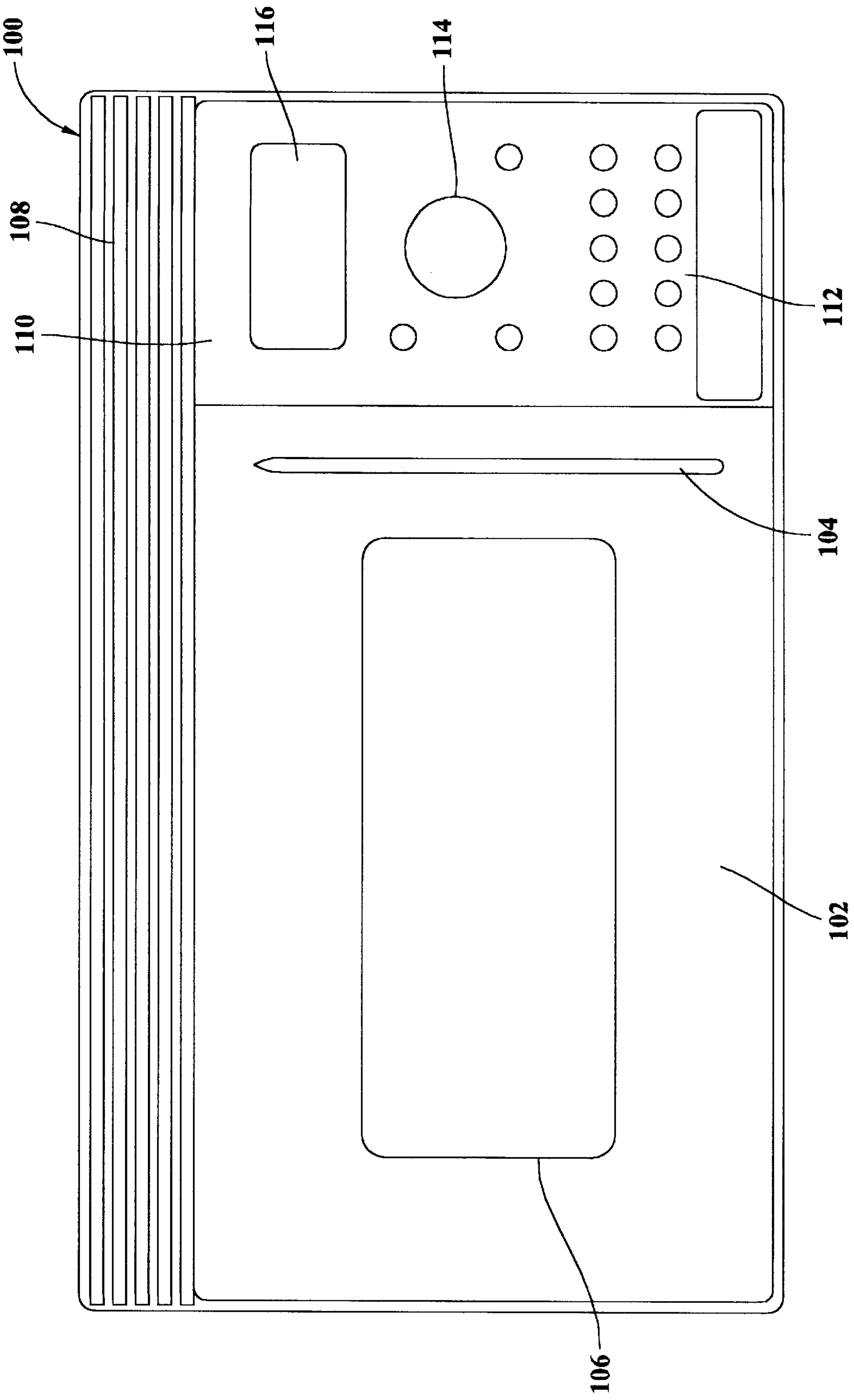
FIG. 1 is a front view of an oven in accordance with one embodiment of the present invention.

FIG. 1 is a front view of an over the range type oven 100 in accordance with one embodiment of the present invention. Oven 100 includes a frameless glass door 102 having an injection molded handle 104. A window 106 is provided for visualizing food in the oven cooking cavity. Door 102 has an inner metal frame that extends around the door periphery and comprises an RF door choke. The glass of door 102 has, for example, a thickness of about 1/8" (0.32 cm) and can withstand high temperatures and is secured to the inner metal frame by an adhesive. Handle 104 also is secured to the metal frame by bolts that extend through openings in the glass. Oven 100 also includes an injection molded plastic vent grille 108 and a frameless glass control panel 110.

Rubber tactile switch covers 112 are located over each key pad of panel 110, and an injection molded knob or dial 114 is provided for making multiple selections. Selections are made using dial 114 by rotating dial 114 clockwise or counter-clockwise and when the desired selection is displayed, pressing dial 114. Instructions and selections are displayed on a liquid crystal display 116.

The following functions can be selected from respective key pads of panel 110.

| | |
|---|---|
| CLEAR/OFF | Selecting this pad stops all cooking and erases the current program. |
| DELAYED START | Selecting this pad results in a delay in the start of cooking. |
| HELP | Selecting this pad enables an operator to find out more about the oven and its features. |
| MICROWAVE | Selecting this pad enables defrosting, heating beverages, reheating leftovers, popcorn, vegetables, and all types of microwave cooking. |
| MICROWAVE EXPRESS | Selecting this pad enables quick and easy warming of a sandwich, or reheat of coffee. |
| OPTIONS ON/OFF | Selecting this pad enables access to the auto night light, beeper volume control, clock, clock display, and display scroll speed features. |
| OVEN LIGHT | Selecting this pad during microwave cooking illuminates the cavity. |
| POWER LEVEL | Selecting this pad enables adjusting the power levels for speed cooking and microwave cooking. |
| REMINDER | Selecting this pad enables an operator to select a time at which an alarm is to sound. |
| REPEAT LAST | Selecting this pad facilitates cooking repetitive items such as cookies and appetizers. |
| SPEED COOK MANUAL | Selecting this pad enables an operator to manually enter speed cooking time and power levels. |
| START/PAUSE | Selecting this pad enables an operator to start or pause cooking. |
| SURFACE LIGHT | Selecting this pad turns ON/OFF the surface light for the cooktop. |
| TIMER ON/OFF | Selecting this pad controls a general purpose timer (e.g., minutes and seconds) |
| VENT FAN | Selecting this pad enables an operator to clear the cooktop area of smoke or steam. |

Figure 2:
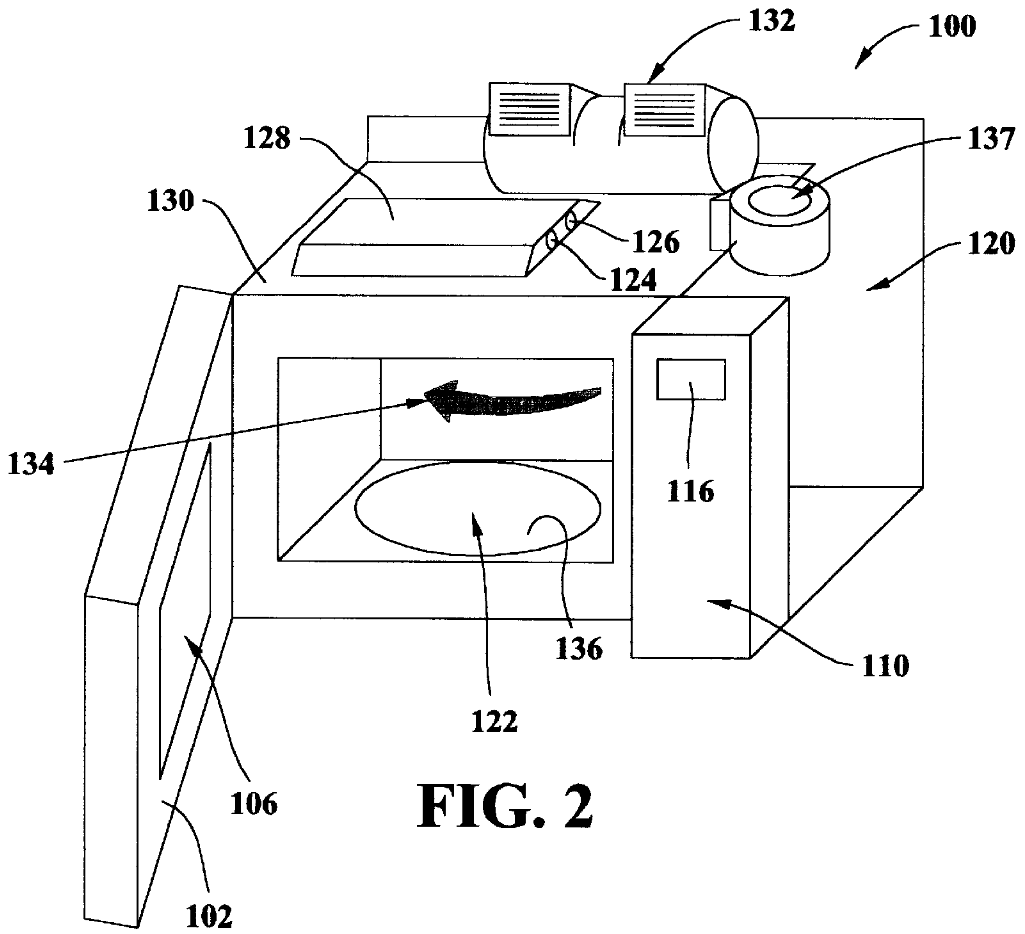
FIG. 2 is a perspective schematic view of a portion of the oven shown in FIG. 1.

FIG. 2 is a perspective schematic view of a portion of oven 100. Oven 100 includes a shell 120, and a cooking cavity 122 is located within shell 120. Cooking cavity 122 is constructed using high reflectivity (e.g., 72% reflectivity) stainless steel. Halogen lamps 124 and 126, and a reflective plate 128 are mounted to an upper panel 130 of shell 120. As described below in more detail, a halogen lamp also is located at a lower section of shell 120. An exhaust system 132 also is mounted to shell 120. Air flows through cavity 122 in a direction indicated by arrow 134. A cooling system 137 is mounted to shell 120 for cooling oven components. Exemplary dimensions of oven 100 are set forth below.

| Shell | | |
|---|---|---|
| Exterior Height (front) | 15 11/16" | (39.85 cm) |
| Exterior Height (rear) | 16½" | (41.25 cm) |
| Exterior Width | 29⅘" | (75.57 cm) |
| Exterior Depth | 14⅘" | (37.59 cm) |

-continued

| Cooking Cavity | | |
|---|---|---|
| Cavity Height | 8⅖" | (21.34 cm) |
| Cavity Width | 19 2/7" | (48.99 cm) |
| Cavity Depth | 13⅗" | (34.54 cm) |

Figure 3:
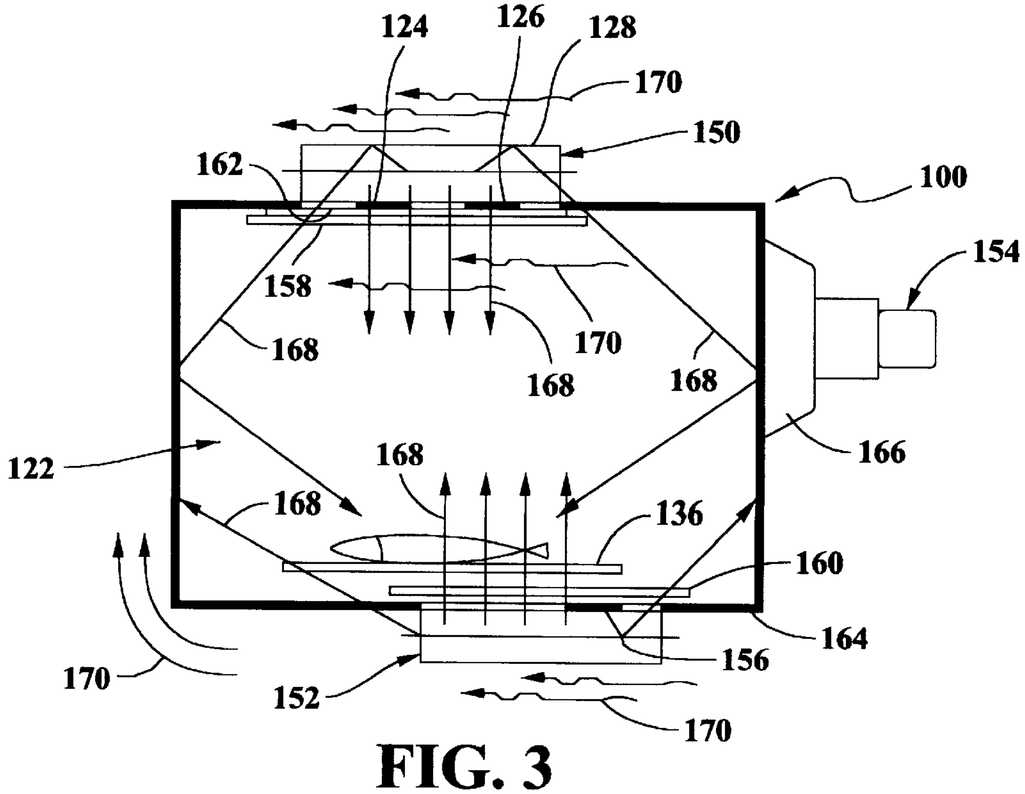
FIG. 3 is a schematic illustration of the radiant cooking unit and the microwave cooking unit relative to the cooking cavity.

FIG. 3 is a schematic illustration of oven 100, and particularly of halogen lamp cooking units 150 and 152 and microwave cooking unit 154 relative to cooking cavity 122. As shown in FIG. 3, upper cooking unit 150 includes two halogen lamps 124 and 126 and lower cooking unit 152 includes one halogen lamp 156. Lamps 124, 126, and 156, in an exemplary embodiment, are 1500 W halogen lamps having, a color temperature of 2300 K, each with an output power of 1.5 kW (4.5 kW total for all three lamps). Lamp 124 is referred to as the upper center lamp, and lamp 126 is referred to as the upper exterior lamp. Lamp 156 is referred to as the lower lamp. Glass plates 158 and 160 extend over cooking units 150 and 152 between lamps 124, 126, and 156 and cavity 122. Also, twist mesh screens 162 and 164 having an opening ratio of 80% are provided for additional protection. Additional details are provided below with respect to reflector 128. A magnetron 166 of microwave cooking unit 154 is located on a side of cavity 122. Magnetron 166, in an exemplary embodiment, delivers a nominal 950 W into cavity 122 according to standard IEC (International Electrotechnical Commission) procedure.

Figure 4:
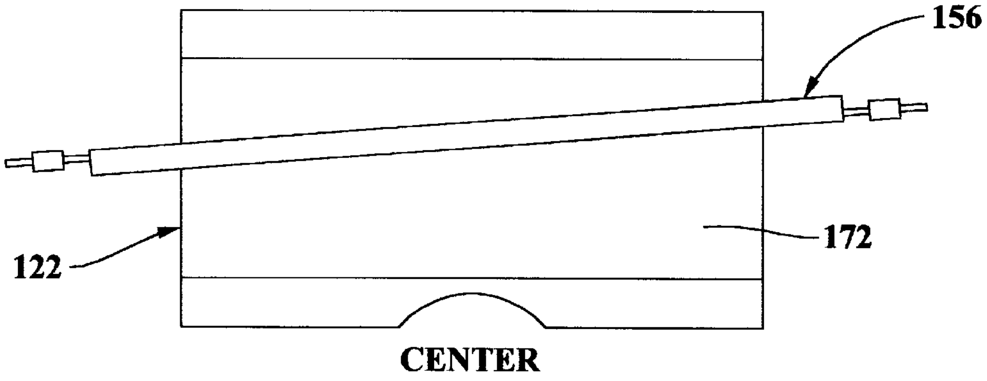
FIG. 4 is a schematic illustration of the lower lamp of the oven shown in FIG. 1.

With respect to lower lamp 156, and referring to FIG. 4, lamp 156 is located off center and at an angle relative to a bottom surface 172 of cavity 122. Such location of lower lamp 156 results, for example, in lowering the temperature of the rollers on turntable 136.

Figure 5:
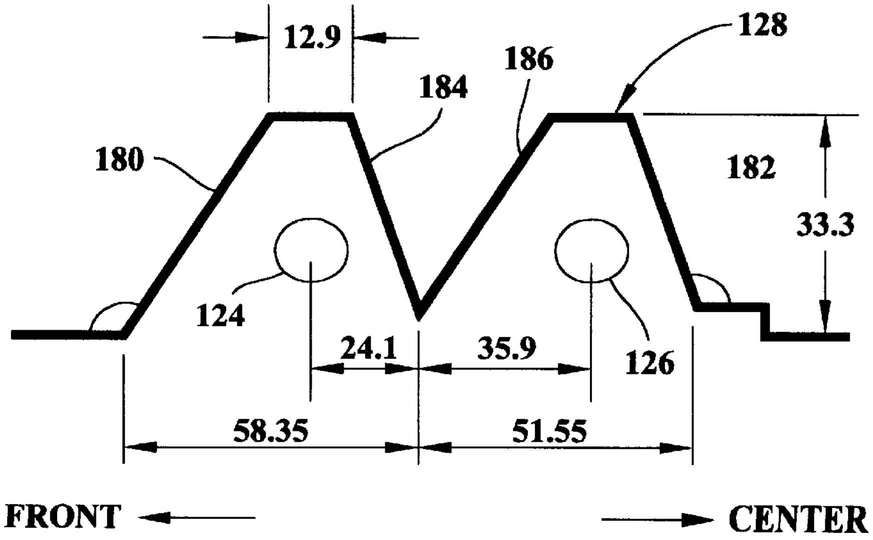
FIG. 5 is a schematic illustration of the reflector for the upper lamps of the oven shown in FIG. 1.

FIG. 5 is a schematic side illustration of reflector 128. Reflector 128 includes angular side sections 180 and 182 and angular center sections 184 and 186. The dimensions (in millimeters) indicated in FIG. 5 are exemplary and have been found suitable for at least one oven. By selecting the reflector dimensions as indicated in FIG. 5, upper lamps 124 and 126 are believed to provide more even cooking of items located on turntable 136.

Figure 6:
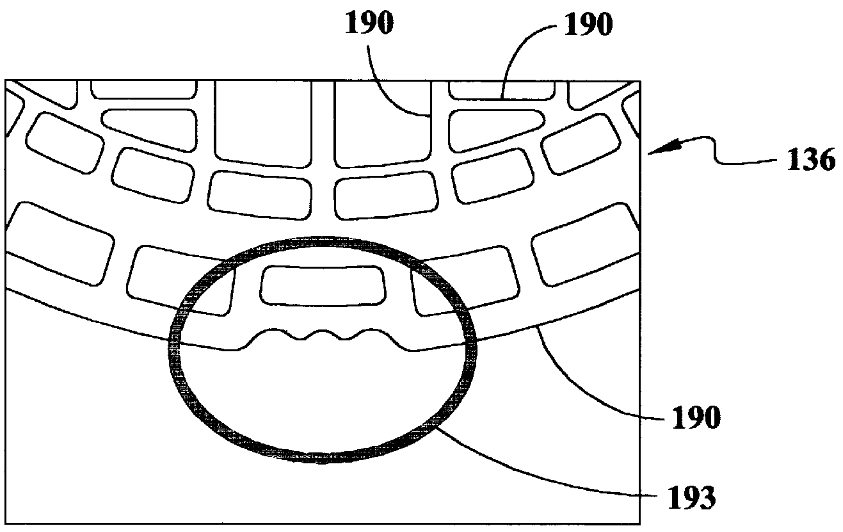
FIG. 6 is an illustration of a portion of the turntable of the oven shown in FIG. 1.

FIG. 6 illustrates a portion of turntable 136. Turntable 136 has an open grille construction with a 70% energy transmission. Turntable 136 rotates at about 6 r.p.m. and has a diameter of about 11 ⅛" (28.26 cm). Turntable 136 includes metal segments 190 with ceramic rollers 192, one of which is illustrated within circle 194.

Figure 7:
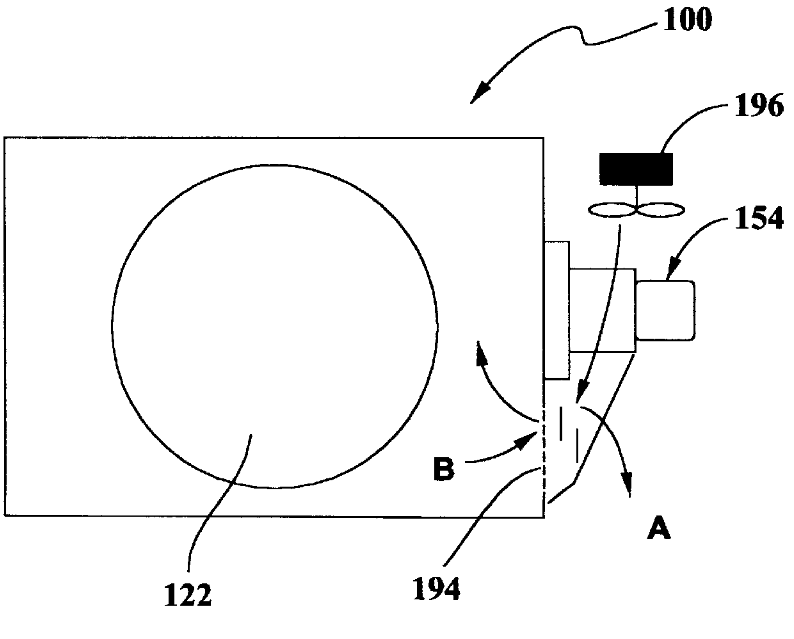
FIG. 7 is a schematic illustration of the cooking cavity of the oven shown in FIG. 1, including a damper to control air flow.

FIG. 7 illustrates a damper 194 located below microwave cooking unit 154. Damper 194 is open when in the microwave only mode to enable air to flow through cavity 122. In the speed cooking and radiant only mode, damper 194 closes to prevent air from flowing in a reverse direction and back towards microwave cooking unit 154.

Figure 8:
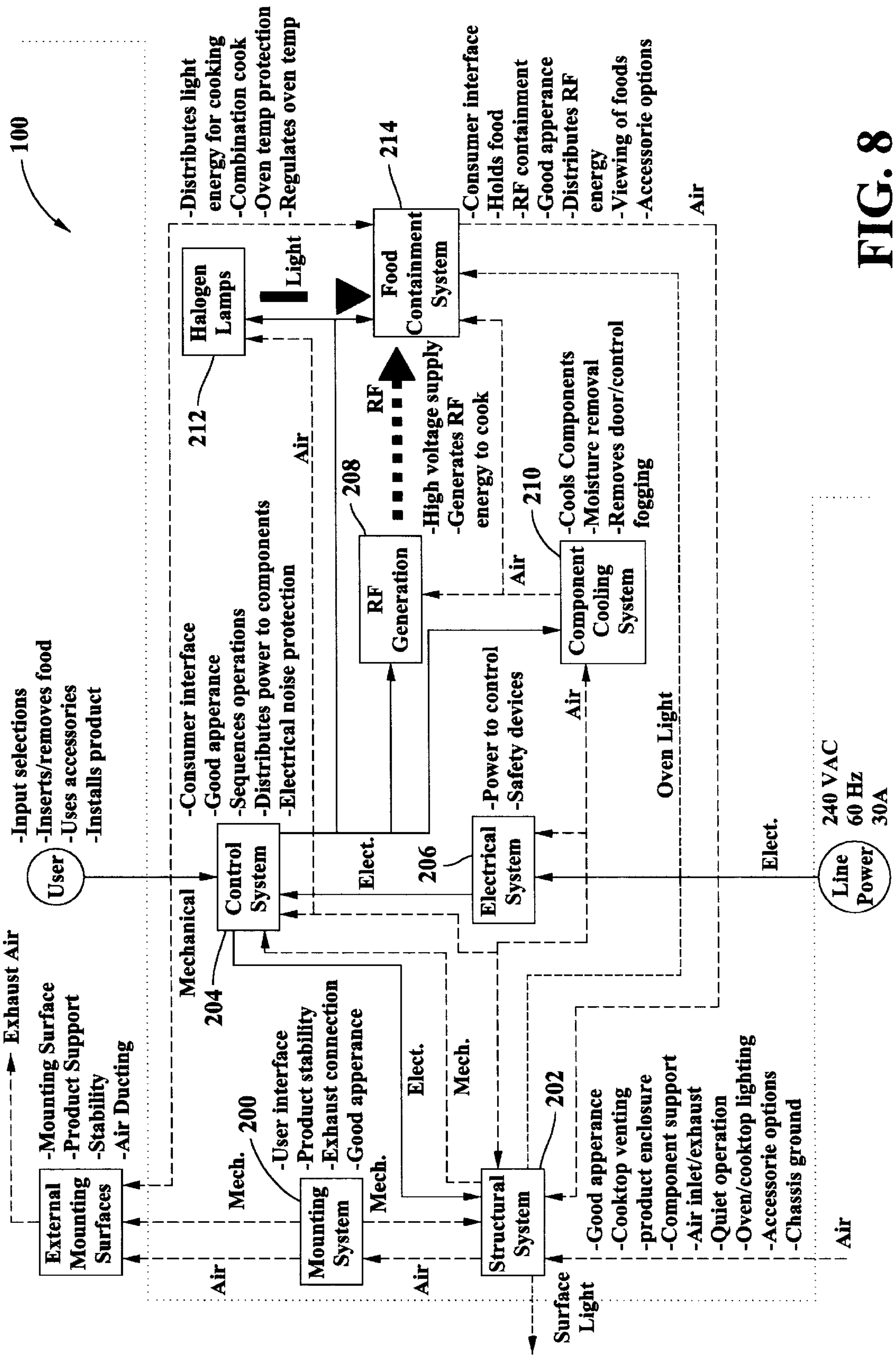
FIG. 8 is a functional block diagram of the oven shown in FIG. 1.

FIG. 8 is a functional block diagram of oven 100. As shown in FIG. 8, oven 100 includes a mounting system 200, a structural system 202, a control system 204, an electrical system 206, RF generation 208, a component cooling system 210, halogen lamps 212, and a food containment system 214. Various features of each system are indicated in FIG. 8. Mounting system 200 is provided to enable mounting oven over the range. Mounting system 200 also provides connection with an exhaust to enable removal of fumes from over the cooktop into the exhaust. Structural system 202 generally refers to shell 120, which provides an enclosure. Control system 204 includes an interface, i.e., keypads 112 and dial 114, and also distributes power to the other oven systems. Electrical system 206 powers the control and safety devices. RF generation 208 is performed by magnetron 166, and RF energy output by magnetron 166 is selectively used to cook food in food containment system. Component cooling system 210 is provided to cool the other system and to remove moisture from cavity 122. Halogen lamps 212 generate light energy used for cooking food in food containment system 214.

Figure 9:
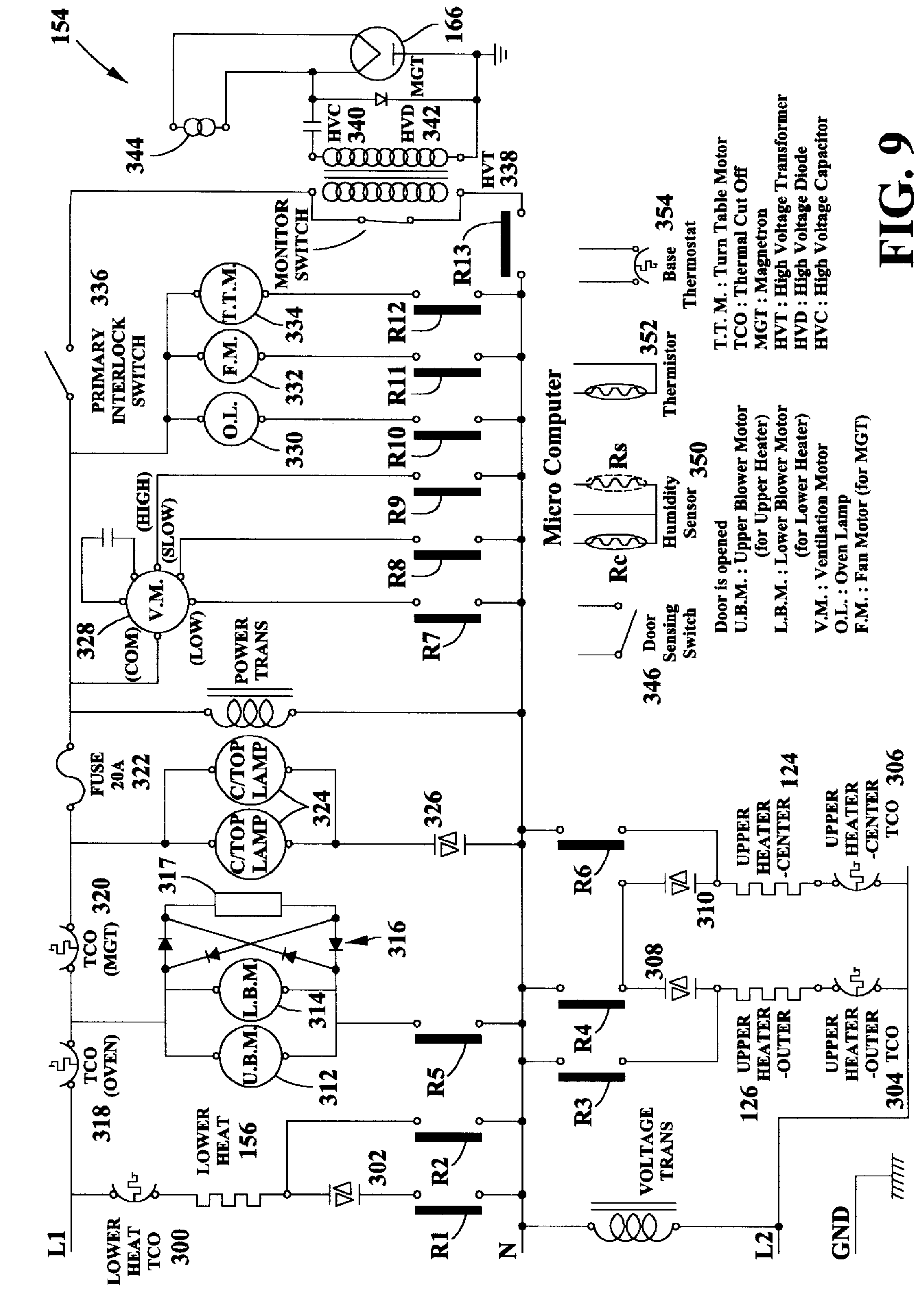
FIG. 9 is a circuit schematic diagram of the oven shown in FIG. 1.

FIG. 9 is a schematic diagram of oven 100. Power is provided to oven 100 via lines L1, L2, and N. Relays R1–R13 are connected to a microcomputer which is programmed to control the opening and closing thereof. Lower lamp 156 is electrically connected to line L1 via a thermal cut off 300. Energization of lower lamp 156 is controlled by relays R1 and R2. A triac is in series with relay R1 to provide a soft start, as described below in more detail. Upper lamps 126 and 124 are connected to line L2 via thermal cut offs 304 and 306. Triacs 308 and 310 are in series with relay R4.

Relays R1 and R4 are air gap type relays, and are in series with triacs 302 and 308, respectively. Relays R1 and R4 are closed in the soft start operation of respective lamps 124, 126, and 156 to enable energization of triacs 302 and 308. After completion of the soft start, relays R1 and R4 are open. Relays R2, R3, and R6 are controlled by the microcomputer to close after the soft start is completed to hold lamps 124, 126, and 156 on based on the particular power setting.

Oven 100 also includes an upper blower motor 312 and a lower blower motor 314 for cooling. A rectifier circuit 316 is provided for rectifying an AC input signal to a DC output signal to be supplied to a synchronous motor 317. Synchronous motor 317, when energized, closes damper 194. Thermal cut outs 318 and 320 and a fuse 322 also are provided to protect oven components, e.g., from overheating or an overcurrent condition. Cooktop lamps 324 are electrically connected in series with a triac 326 and are provided for illuminating the cooktop.

A vent motor 328 having low, slow, and high speeds selectable via relays R7, R8, and R9 is provided for removing fumes from over the cooktop. An oven lamp 330, fan motor 332, and a turn table motor 334 are controlled by separate relays R10, R11, and R12. A primary interlock switch 336 is located in door 102 and prevents energization of cooking elements unless door 102 is closed. A relay R13 controls energization of microwave cooking unit 154. Microwave cooking unit 154 includes a high voltage transformer 338 which steps up the supply voltage from 120V to 2000V. A high voltage capacitor 340 and a high voltage diode 342 circuit steps up the voltage from transformer 338 from 2000V to 4000V. This high voltage is supplied to magnetron 166 and the output of magnetron 166 is supplied to a waveguide 344 which directs RF energy into cooking cavity 122. As also shown in FIG. 9, oven 100 includes a door sensing switch 346 for sensing whether door 102 is opened, a humidity sensor 350 for sensing the humidity in cooking cavity 122, a thermistor 352, and a base thermostat 354.

With respect to speed cooking operation of oven 100, the microcomputer controls relays R1–R6 and R13 based on the power level either associated with the preprogrammed cooking program or manually entered. In the speed cooking mode, for example, if a power level 9 is selected, the upper exterior lamp 124 has a target on-time of 29 seconds of a 32 second duty cycle, upper center lamp 126 has a target on-time of 25 seconds of a 32 second duty cycle, lower lamp 156 has a target on-time of 29 seconds of a 32 second duty cycle, and magnetron 16 has a target on-time of 29 seconds of a 32 second duty cycle. A duty cycle of 32 seconds is selected for one particular implementation. However, other duty cycles could be utilized. Set forth below is a chart which sets forth the target on-times based on power level.

| Power Level | Upper Exterior Lamp | Upper Center Lamp | Lower Lamp | Magnetron |
|---|---|---|---|---|
| 0 | 0 | 0 | 0 | 0 |
| 1 | 3 | 3 | 3 | 3 |
| 2 | 6 | 5 | 6 | 6 |
| 3 | 10 | 8 | 10 | 10 |
| 4 | 13 | 11 | 13 | 13 |
| 5 | 16 | 14 | 16 | 16 |
| 6 | 19 | 16 | 19 | 19 |
| 7 | 22 | 19 | 22 | 22 |
| 8 | 26 | 22 | 26 | 26 |
| 9 | 29 | 25 | 29 | 29 |
| 10 | 32 | 27 | 32 | 32 |

To increase lamp reliability, a soft start operation is used when energizing lamps 124, 126, and 156. Particularly, in accordance with the soft start operation, triacs 302, 308, and 310 are utilized to delay lamp turn-on. For example, upper exterior lamp 126 and lower lamp 156 are delayed for one second from commanded turn-on to actual turn-on. Upper center lamp 124 is delayed for two seconds from commanded turn-on to actual turn-on. Therefore, the target turn-on times are different from the commanded on-times. Set forth below is a table containing the commanded on-times based on power level selected.

| Power Level | Upper Exterior Lamp | Upper Center Lamp | Lower Lamp | Magnetron |
|---|---|---|---|---|
| 0 | 0 | 0 | 0 | 0 |
| 1 | 4 | 5 | 4 | 3 |
| 2 | 7 | 7 | 7 | 6 |
| 3 | 11 | 10 | 11 | 10 |
| 4 | 14 | 13 | 14 | 13 |
| 5 | 17 | 16 | 17 | 16 |
| 6 | 20 | 18 | 20 | 19 |
| 7 | 23 | 21 | 23 | 22 |
| 8 | 27 | 24 | 27 | 26 |
| 9 | 30 | 27 | 30 | 29 |
| 10 | 32 | 29 | 32 | 32 |

For example, if upper lamps 124 and 126 are to operate at power level 7, then upper lamp 124 would be commanded to operate for 21 seconds and upper exterior lamp 126 would be commanded to operate for 23 seconds. Lamps 124 and 126 would be commanded to turn-on for 21 and 23 seconds, respectively, at the beginning of each 32 second duty cycle. Due to the soft-start delays, lamps 124 and 126 would actually be on for 19 seconds (lamp 124) and 22 seconds (lamp 126) of each 32 second duty cycle.

Figure 10:
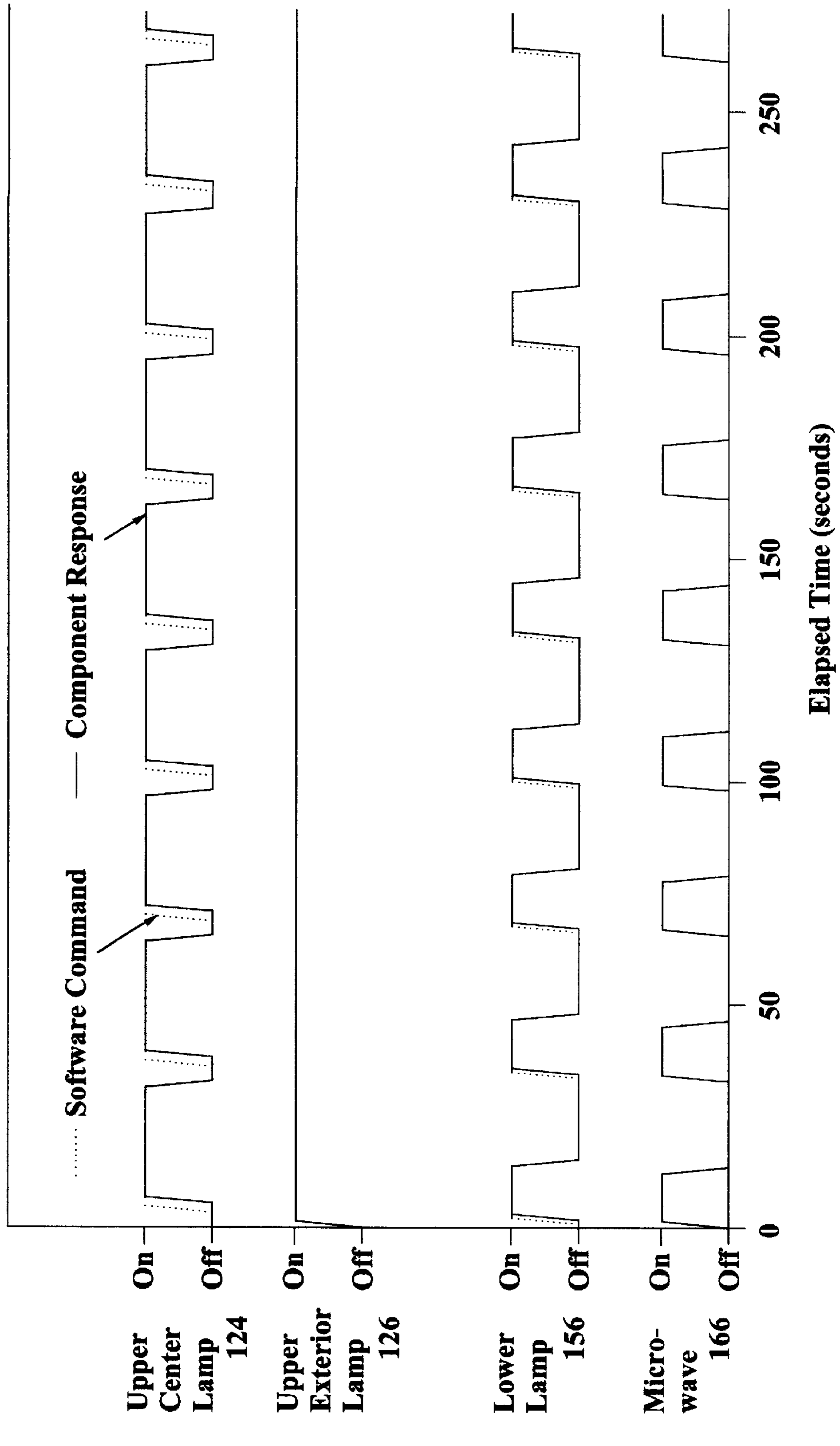
FIG. 10 is a timing diagram illustrating target and command times for energizing the cooking elements.

FIG. 10 is a timing diagram illustrating the state of lamps 124, 126, and 156, and magnetron 166. In the example, refrigerated crescent rolls are to be cooked in accordance with the following:

| | |
|---|---|
| Total Time: | 4:30 |
| Upper Power Level: | 10 |
| Lower Power Level: | 3 |
| Microwave Power Level: | 3 |

As shown in FIG. 10, upper center lamp 124 is commanded on (dashed line) two seconds before it actually turns on (solid line). Lamp 124 is on for 27 seconds of each 32 second period. Upper exterior lamp 126 is always on during this period. Lower Lamp 156 is on one second after it is commanded to turn on, and in on for 10 seconds out of each 32 second period. Magnetron 166 has no delay between command and execution of on time, and is on for 10 seconds of each 32 second period.

Figure 11:
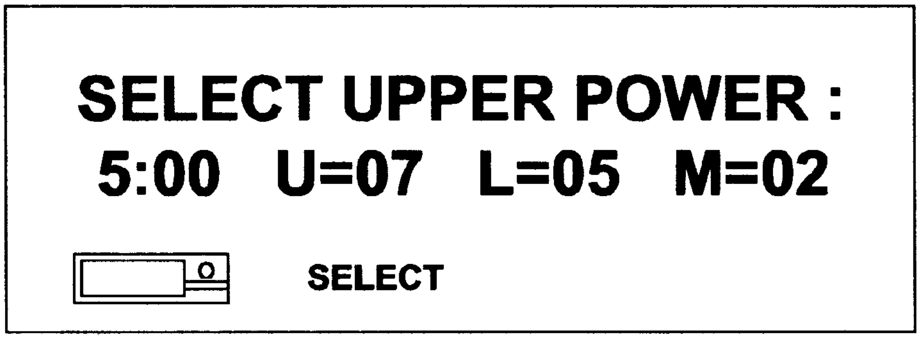
FIGS. 11–14 illustrate messages displayed when adjusting/entering the power level and cooking time.
Figure 12:
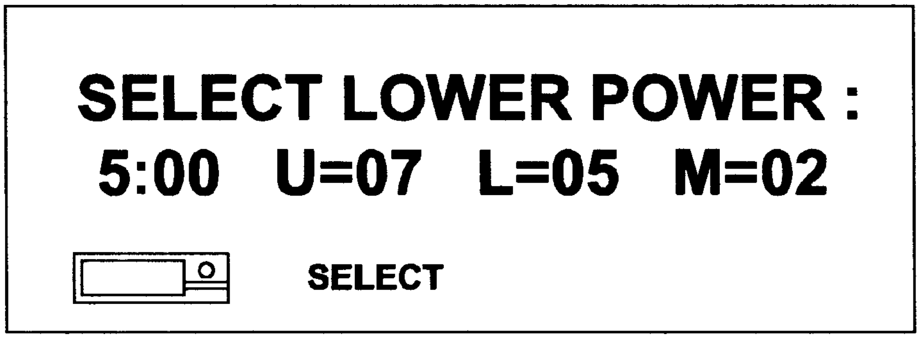
Figure 13:
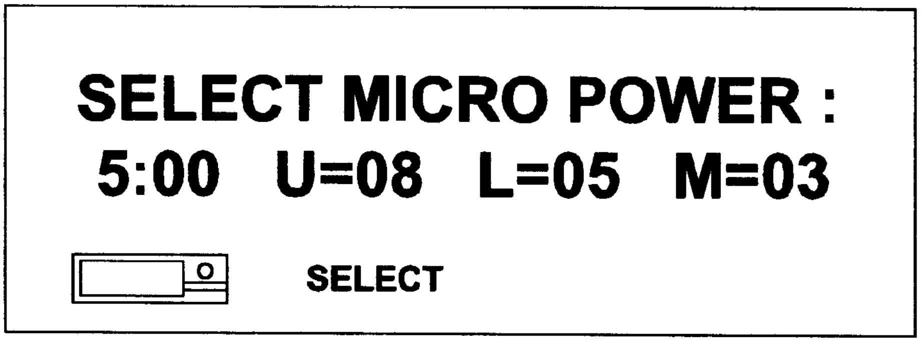
Figure 14:
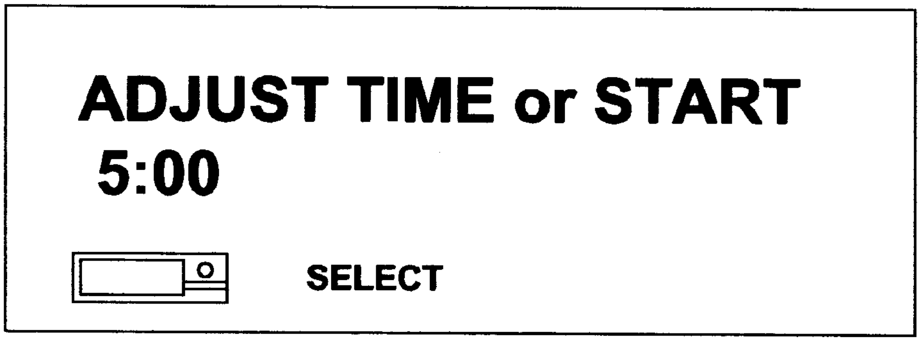

An operator may adjust the power level of the upper lamps, the lower lamp, and the microwave during operation. To change the power level, the operator selects the POWER LEVEL pad and a select icon flashes on display 116. A message "Select UPPER POWER" then is displayed as shown in FIG. 11. Rotation of dial 114 then enables an operator to select the upper power level (clockwise rotation increases the power level and counter clockwise rotation decreases the power level). When dial 114 is pressed to enter the selection, a short beep sounds and "Select LOWER POWER" is displayed as shown in FIG. 12. Dial rotation then alters the current lower power level, and when dial 114 is pressed, a short beep is sounded. Then, "Select MICRO POWER" is displayed as shown in FIG. 13. Dial rotation now alters the microwave power level. When dial 114 is pressed to enter the selection, a short beep is sounded and the OVEN icon flashes and the SELECT icon is turned off. "ADJUST TIME or START" is then displayed as shown in FIG. 14. The time may be adjusted or the START pad pressed.

When the power level pad is pressed at an acceptable time during lightwave cooking, i.e., one or more of the lamps are energized, the cooking countdown continues and the UPL (FIG. 11), LPL (FIG. 12) and MPL (FIG. 13) displays appear. The same operation as described above is utilized except that after entering the new microwave power level, 2 short beeps are sounded and the countdown and UPL, LPL and MPL display continue for 2.0 seconds. After 2.0 seconds, the UPL, LPL and MPL displays are removed and only the cooking countdown continues. If the power level pad is pressed when it is not allowed to change/enter or recall the power level, a beep signal (0.5 seconds at 1000 hz) sounds and the message "POWER LEVEL MAY NOT BE CHANGED AT THIS TIME" scrolls on display 114. After the scroll has completed, the previous foreground features return. If the power level pad is pressed at a time when a change/entry is allowed, but no dial rotation or entry occurs within 15 seconds, the UPL, LPL and MPL display are removed and the display returns to the cooking countdown.

Figure 15:
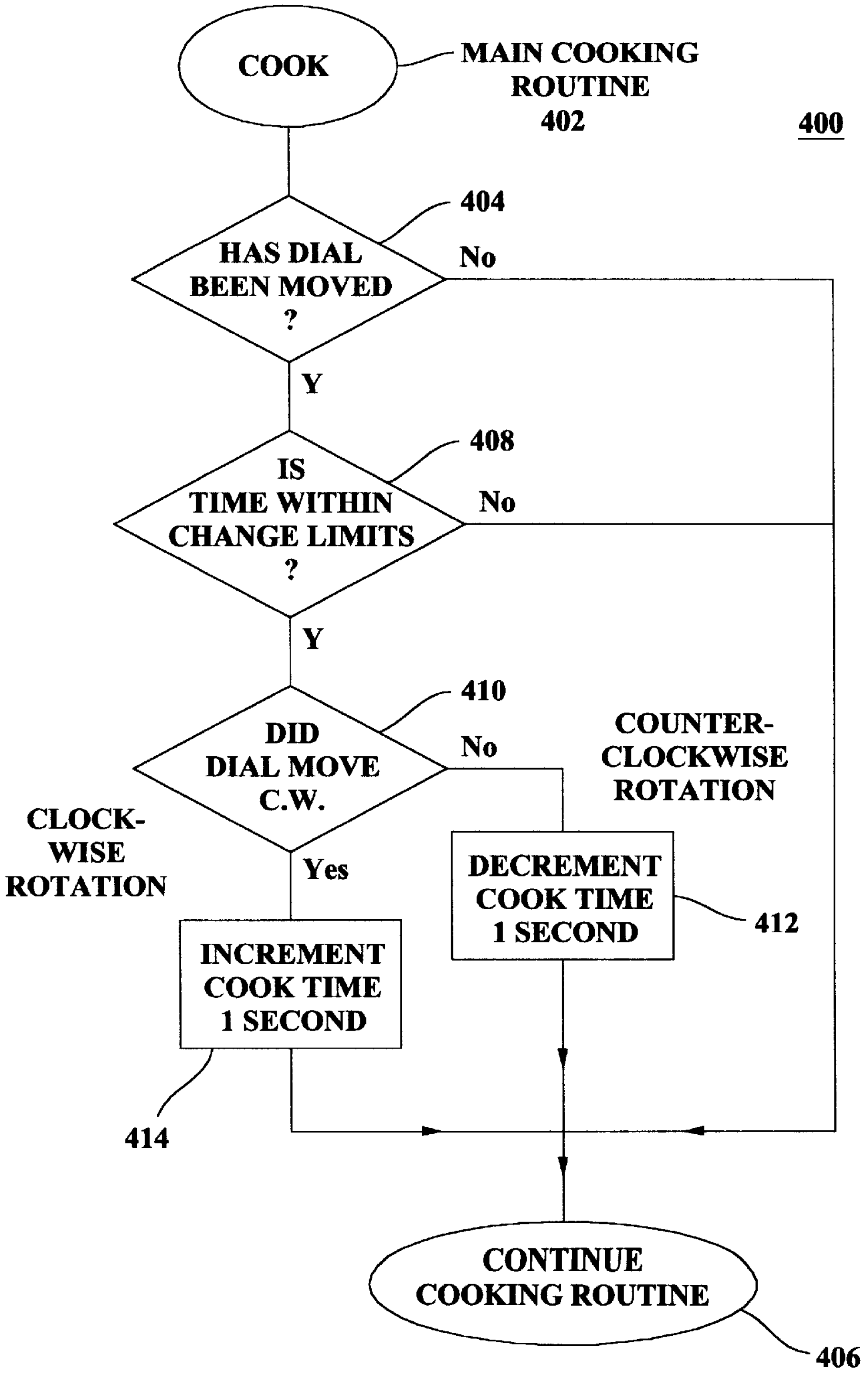
FIG. 15 is a flow chart illustrating process steps executed when adjusting the cook time.

FIG. 15 is a flow chart 400 illustrating process steps executed when adjusting the cook time during cooking operations. During cooking operations, a main cooking routine COOK is executed. If dial 114 is not moved 404, the main cooking routine continues to be executed 406. If dial 114 is moved, then the microcomputer determines whether a time change can be made, e.g., is the time remaining within the change limits 408. For example, if only 15 seconds remain in a cooking operation, no time change may be allowed to prevent an operator from shutting down a cooking operation by rotating dial 114 until zero is displayed, sometimes referred to as a "hard shutdown", which may not be desirable. If the remaining time is not within the change limits, then the main cooking routine continues to be executed 406. If the remaining time is within the change limits, then the microcomputer determines whether dial 114 was moved clockwise 410. If no (i.e., dial 114 was moved counterclockwise), then for each increment that dial 114 is moved, the cook time is decremented by one second 412. If yes, then for each increment that dial 114 is moved, the cook time is incremented by one second 414.

Figure 16:
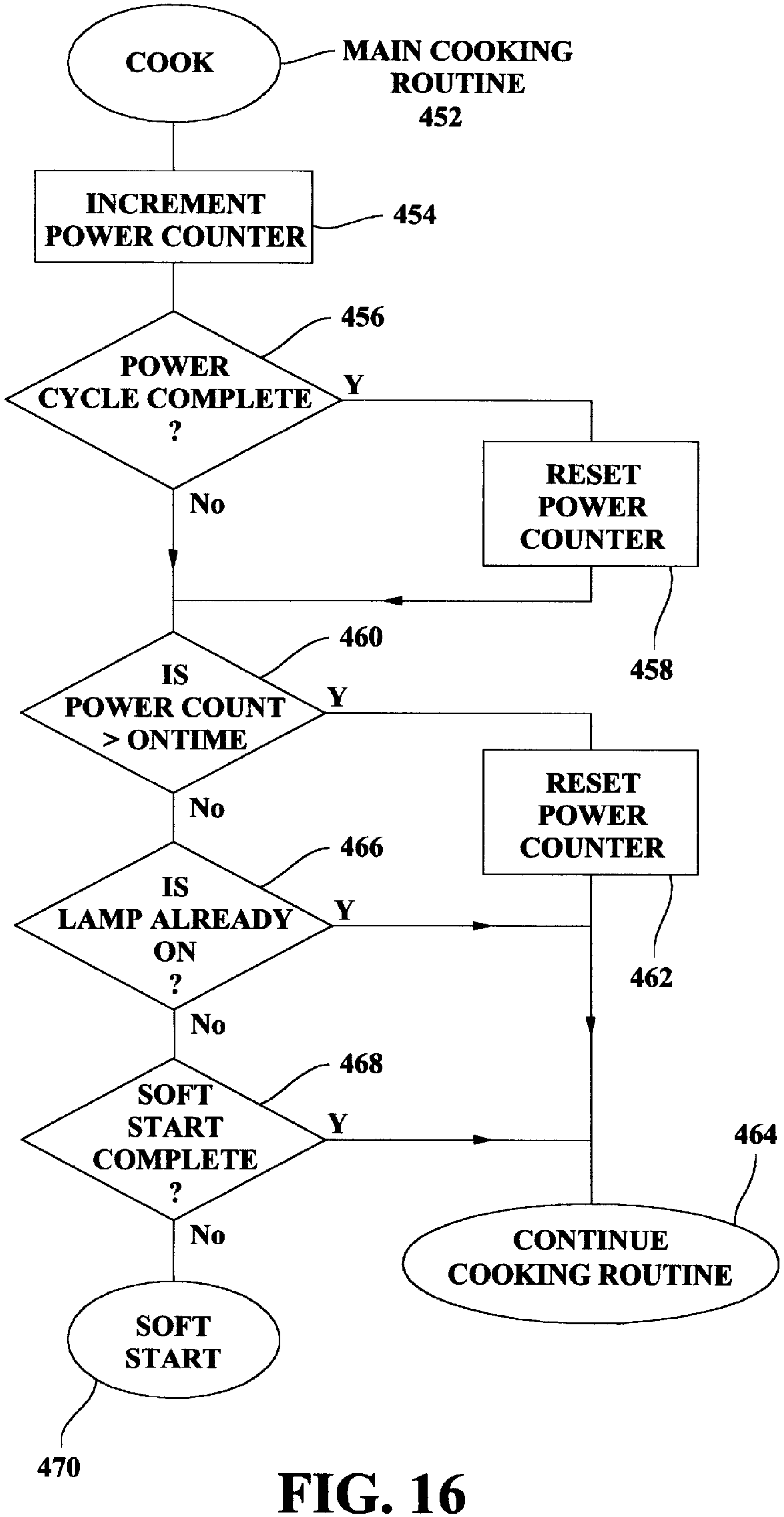
FIG. 16 is a flow chart illustrating process steps for lamp power level control.

FIG. 16 is a flow chart illustrating process steps 450 for lamp power level control. Such control is used to control energization of lamps 124, 126, and 156 (FIG. 9). More particularly, a main cooking routine 452 is executed during normal cooking operations. A power counter is incremented 454 for each one second interval, and the microcomputer then checks whether a power cycle is complete 456. For example, and as explained above, each duty cycle has a duration of 32 seconds. If the duty cycle is complete, then the power counter is reset 458. If the duty cycle is not complete, or after resetting the counter, then the microcomputer checks whether the power count is greater than the "on time" 460. The "on time" is equal to the time corresponding to the selected power level for each lamp, as explained above. If the power count is greater than the "on time", then the particular lamp is de-energized 462 and cooking continues with the main cooking routine 464. If the power count is less than or equal to the "on time", then the microcomputer checks whether the lamp is already on 466. If yes, then cooking operations continue 464. If no, then the microcomputer checks whether the soft start has been completed 468. If the soft start has been completed, then operations continue with the cooking routine 464. If soft start operations are not complete, then the soft start routine is called 470.

Figure 17:
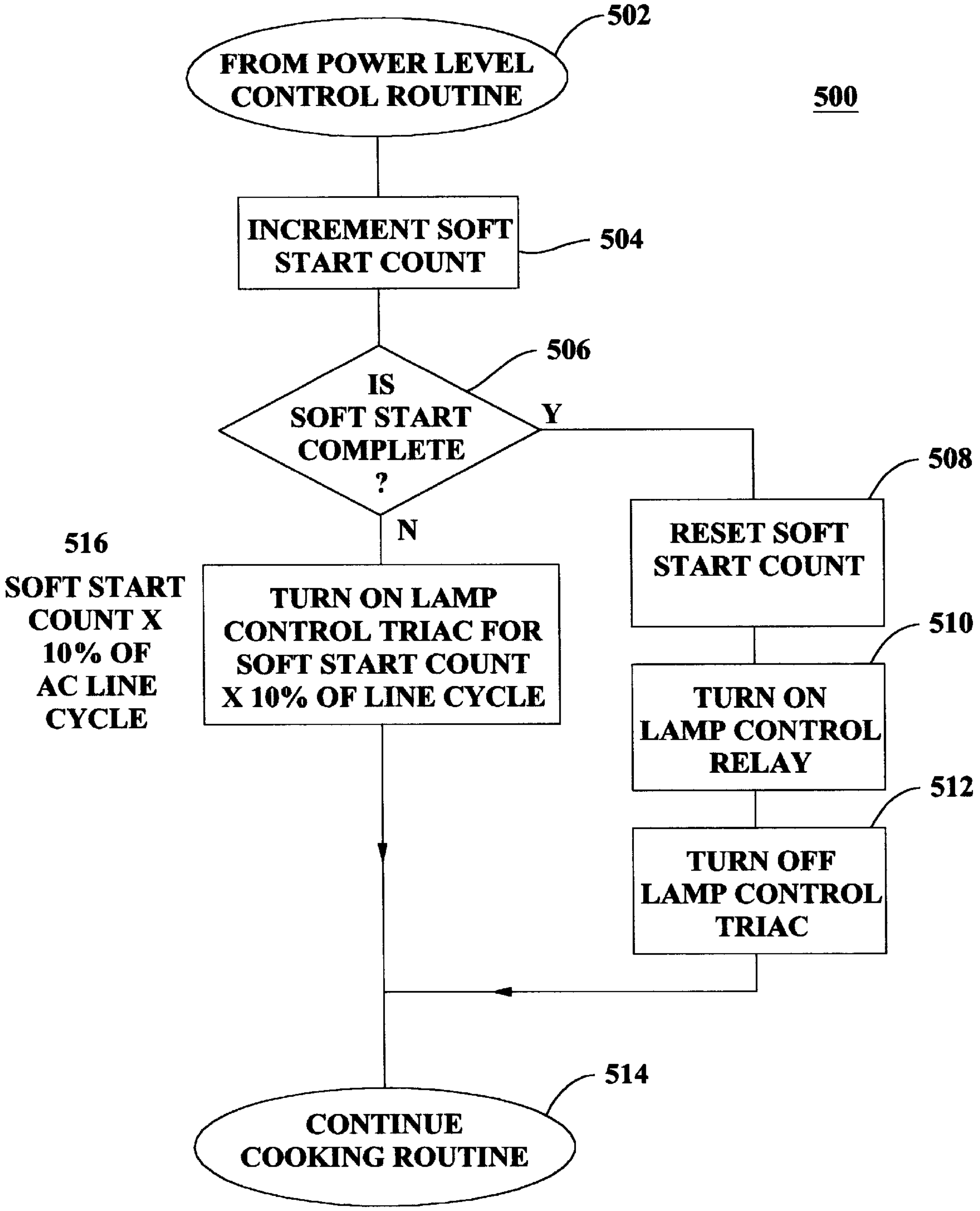
FIG. 17 is a flow chart illustrating process steps for the soft start of the Halogen lamps.

FIG. 17 is a flow chart illustrating process steps for the soft start routine 500. As explained above, the soft start for the halogen lamps is utilized to increase the lamp reliability. When routine 500 is called from the power level control routine 502, the microcomputer then increments a soft start counter 504. The microcomputer then determines whether the soft start is complete (e.g., depending on the lamp, the soft start has a duration of 1 or 2 seconds, as explained above). If soft start is complete, then the microcomputer resets the soft start counter 508, turns on the lamp control relay 510, and turns off the lamp control triac 512. Operations then proceed to the cooking routine 514. If soft start is not complete, then the microcomputer turns on the lamp control triac for a soft start count ×10% of the line cycle 516. Operations then proceed to the cooking routine.

The glass of the oven door is very dark and does not enable visualization of food within cavity 122 unless at least one of the Halogen lamps is on and sufficiently energized to illuminate cavity 122. Therefore, in some cooking operations such as the microwave only mode of cooking or when radiant cooking at low power levels, and in order to visualize food in cooking cavity 122, an operator may select the microwave button on keypad 112. When this pad is selected during cooking, the microcomputer energizes upper center lamp 124 for four seconds at full power (i.e., power level 10), with a soft start, i.e., two seconds of soft start and two seconds of power level 10 energization for a total of four seconds, as described above. Lamp 124 illuminates the cooking cavity sufficiently so that an operator can visualize the food through window 106.

Figure 18:
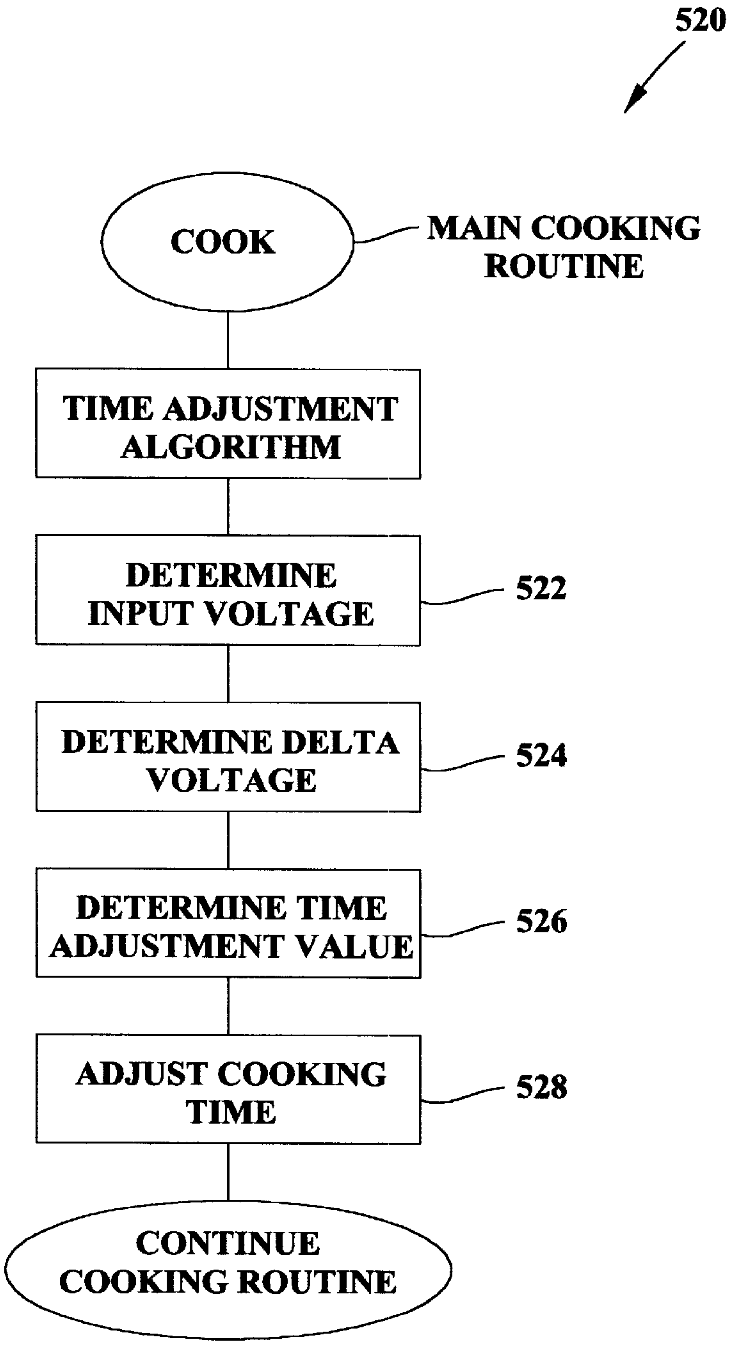
FIG. 18 is a flow chart illustrating process steps of a time adjustment algorithm.

FIG. 18 is a flow chart of a time adjustment algorithm or method 520 to compensate for varying input voltages to lamps 124, 126, and 156. Time adjustment algorithm 520 is utilized to provide that total energy into the food is constant for an input voltage in a range between about 108 Volts and 132 Volts. More particularly, and in one embodiment, time adjustment algorithm 520 provides that total cooking time is adjusted by subtracting or adding a time adjustment value to a selected total cooking time. The time adjustment value, in one embodiment, is determined in accordance with the following relationship.

$$\text{Time Adjustment} = \text{Total cooking time} * \{5(\text{Voltage Deviation}/120\ (\mathit{Volts}))^2 - 1.5(\text{Voltage Deviation}/120\ \text{Volts})\}$$

The total cooking time adjustment value 526 is determined as described above by mathematical manipulation of a voltage ratio calculated by dividing a voltage deviation value by the nominal input voltage 524. The voltage deviation value is the deviation from nominal 120 Volts, i.e., actual voltage level minus 120 Volts. The actual voltage level is determined by the microcomputer sampling the input voltage 522 to lamps 124, 126, and 156. The time adjustment value 526 may have a positive or negative value, and is simply added to the total cooking time value to determine an adjusted cooking time 528. Specifically, the time adjustment is determined by the microcomputer prior to initiating cooking, i.e., by determining the magnitude of the input voltage and determining the time adjustment value as set forth above, and is added to the initial total cook time determined based on the user inputs as described above.

For example, if the cooking algorithm selected requires that the upper lamps be energized for a total of 4:00 minutes (240 seconds) at nominal (120V) conditions, then the following adjustments would be made for off-nominal conditions.

If line voltage is 132V, then:

$$\Delta V=132-120=12V.\ \text{So}\ \Delta V/V_0=12/120=0.1$$

$$\text{Then}\ \ \Delta T/T_0 = 5(\Delta V/V_0)^2 - 1.5(\Delta V/V_0)$$
$$= 5*0.01 - 1.5*0.1 = -0.1$$

Therefore, $\Delta T=-0.1*T_0=-0.1*(240\ \text{sec})=-24$ seconds. At an input voltage of 132 volts, the total cook time used for controlling energization of the upper lamps would be reduced in total time from 240 seconds to 216 seconds.

If the line voltage is 116V, then:

$$\Delta V=116-120=-4V.\ \text{So}\ \Delta V/V_0=-4/120=-0.0333$$

$$\text{Then}\ \ \Delta T/T_0 = 5(\Delta V/V_0)^2 - 1.5(\Delta V/V_0)$$
$$= 5*0.00111 - 1.5*0.0333 = +0.0555$$

Therefore, $\Delta T=+0.0555*T_0=+0.0555*(240\ \text{sec})=+13.3$ seconds. At an input voltage of 116 volts, the total cook time used for controlling energization of the upper lamps would be increased in total time from 240 seconds to 253 seconds.

In one specific example for cooking a biscuit, the algorithm is:

4:30 *U*=10 *L*=05 *M*=06

As a result, the cooking elements are controlled as summarized below.

| | Time | UE | UC | Lower | MW |
|---|---|---|---|---|---|
| Algorithm | 270 sec | 10 | 10 | 5 | 6 |
| Duty Cycle (sec) | | 32 | 32 | 32 | 32 |
| On time per cycle (sec) | | 32 | 27 | 16 | 19 |
| Total On Time (sec) | | 270 | 230 | 142 | 166 |

Over the 270 second run time, 8.4375 duty cycles are executed, which means 8 complete cycles occur, plus the first 14 seconds of a ninth cycle.

If the line voltage is 108V, then:

$$\Delta T/T0=5(\Delta V/V_0)^2-1.5(\Delta V/V_0)=5*0.01-1.5*-0.1=+0.2$$

If the line voltage is 132V, then:

$$\Delta T/T0=5(\Delta V/V_0)^2-1.5(\Delta V/V_0)=5*0.01-1.5*0.1=-0.1$$

The time to be added for each component is set forth below.

| | Time | UE | UC | Lower | MW |
|---|---|---|---|---|---|
| Algorithm | 270 sec | 10 | 10 | 5 | 6 |
| Total on Time (sec) | 270 | 270 | 230 | 142 | 166 |
| Delta Time at 132 V (sec) | −27 | −27 | −23 | −14 | −17 |
| Delta Time at 108 V (sec) | +54 | +54 | +46 | +28 | +33 |

In order to adjust all of the component cook times by the proper amount, only the overall cook time needs to be adjusted by the amount indicated by the equation set forth above, and execution of duty cycles is continued. Thus, in the examples above, the total cook time would be adjusted by −27 seconds for 132V and by +54 seconds for 108V. Specifically, for 132V, the total cook time is 270−27=243 seconds, which results in 7 full duty cycles plus one partial cycle 19 seconds long. The algorithm would then execute as summarized below.

| | Time | UE | UC | Lower | MW |
|---|---|---|---|---|---|
| Algorithm | 232 sec | 10 | 10 | 5 | 6 |
| Duty Cycle (sec) | | 32 | 32 | 32 | 32 |
| On time per cycle (sec) | | 32 | 27 | 16 | 19 |
| Total On Time (sec) | | 243 | 208 | 128 | 152 |

Over the 243 second run time, 7.59375 duty cycles are executed, which means 7 complete cycles occur, plus the first 19 seconds of an eighth cycle. The times for the lamps and microwave are identical to the target times calculated above.

For 108V, the total cook time is 270+54=324 seconds, which results in 10 full duty cycles plus one partial cycle 4 seconds long. The algorithm would then execute as summarized below.

| | Time | UE | UC | Lower | MW |
|---|---|---|---|---|---|
| Algorithm | 324 sec | 10 | 10 | 5 | 6 |
| Duty Cycle (sec) | | 32 | 32 | 32 | 32 |
| On time per cycle (sec) | | 32 | 27 | 16 | 19 |
| Total On Time (sec) | | 324 | 274 | 164 | 193 |

Over the 324 second run time, 10.125 duty cycles are executed, which means 10 complete cycles occur, plus the first 4 seconds of a tenth cycle.

If a 120 second cook time is programmed, three 32 second full blocks plus one 24 second partial block, with the on time for each component occurring at the beginning of each block, even the partial one, are executed. Thus, if a component is scheduled to be on for 27 seconds of each 32 second duty cycle, the following control is executed.

| | | |
|---|---|---|
| | 27 sec on | |
| | 5 sec off | DC 1 (duty cycle 1) |
| | 27 sec on | |
| | 5 sec off | DC 2 (duty cycle 2) |
| | 27 sec on | |
| | 5 sec off | DC 3 (duty cycle 3) |
| | 24 sec on | 24 sec partial DC 4 (partial duty cycle 4) |
| total | 120 seconds. | |

Similarly, if another component is scheduled to be on for 18 seconds of each duty cycle, the following control is executed.

| | | |
|---|---|---|
| | 18 sec on | |
| | 14 sec off | DC 1 (duty cycle 1) |
| | 18 sec on | |
| | 14 sec off | DC 2 (duty cycle 2) |
| | 18 sec on | |
| | 14 sec off | DC 3 (duty cycle 3) |
| | 18 sec off | |
| | 6 sec off | 24 sec partial DC 4 (partial duty cycle 4) |
| total | 120 seconds | |

Using the above described time adjustment, the total energy into the food is maintained constant for input voltages in a range between about 108 Volts and 132 Volts. Such time adjustment provides that suitable cooking results are achieved even when the input voltage varies over a wide range.

It is contemplated that the time adjustment algorithm could be implemented in various forms. For example, in one embodiment, the microprocessor is programmed to calculate a time adjustment value using the quadratic equation set forth above, namely, $$\Delta T/T_0=5(\Delta V/V_0)^2-1.5(\Delta V/V_0) \text{ or } \Delta T=T_0[5(\Delta V/V_0)^2-1.5(\Delta V/V_0)].$$

In an alternative embodiment, the quadratic equation set forth above may be approximated by two linear equations over a selected operating range of an oven voltage input, for example, 108V to 132V. More specifically, for input voltage from 108V to 120V, the time adjustment value may be approximated by the linear relationship $$\Delta T/T_0=-2(\Delta V/V_0)$$

and for input voltages from 120V to 132V, the time adjustment value may be approximated by the linear relationship $$\Delta T/T_0=-1(\Delta V/V_0).$$

These linear relationships closely approximate the above quadratic relationship over the oven operating range of interest. In a further alternative embodiment, the microcomputer calculates time adjustment values using these approximate linear relationships.

In yet another embodiment, microcomputer includes a memory with predetermined time adjustment values corresponding to a range of input voltages. Therefore, rather than calculating a time adjustment value, microcomputer selects an appropriate pre-calculated time adjustment value from a look-table stored in the memory of the microcomputer corresponding to the sampled input voltage. Once selecting the appropriate time adjustment value, the microcomputer adds the time adjustment value to the selected cooking time and executes an appropriate number of duty cycles.

Figure 19:
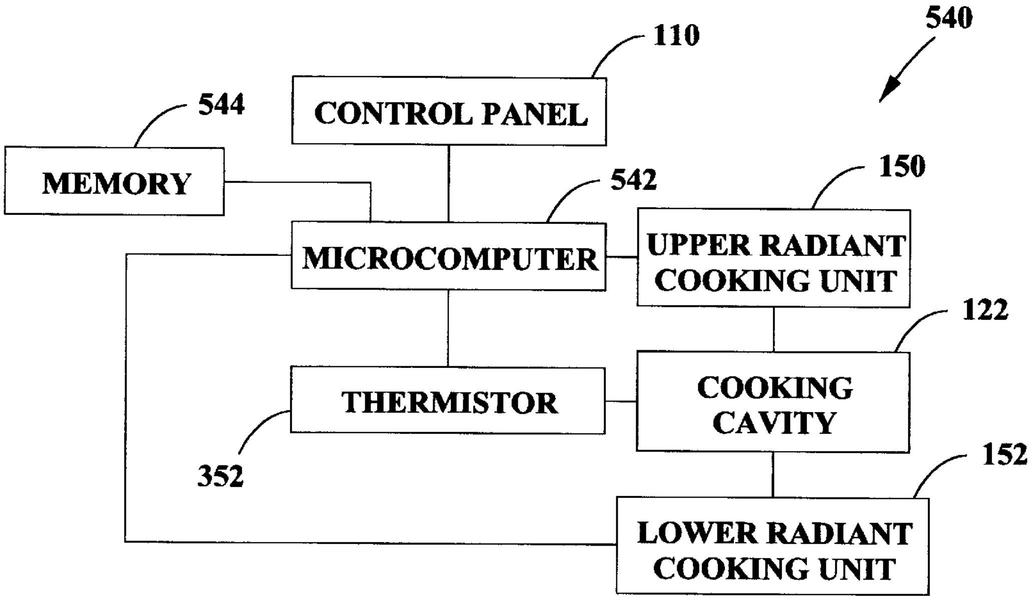
FIG. 19 is a schematic diagram of a thermal compensation system for the oven shown in FIG. 1.

FIG. 19 is a schematic diagram of a thermal compensation system 540 that adjusts for a temperature of cooking cavity 122 prior to cooking operation of oven 100 (shown in FIG. 1). More specifically, thermal compensation system 540 adjusts a power level of upper and lower radiant cooking units 150, 152, respectively, to account for latent heat in cooking cavity 122 that may impart cooking energy to food and cause it to be overcooked.

While thermal compensation system 540 is described in the context of combination oven 100, it is largely independent of the operation of microwave cooking unit 154 (shown in FIG. 3), and therefore is generally applicable to ovens including visible light cooking elements, with and without microwave cooking units. Moreover, it is contemplated that thermal compensation system 540 could be used in ovens including more or less than the two cooking units 150, 152 shown and described herein.

Thermal compensation system 540 includes thermistor 352 in thermal communication with cooking cavity 122, and coupled to a microcomputer 542. Microcomputer 542 is, in turn, operatively coupled to upper and lower radiant cooking units 150, 152, respectively, for controlling a respective power level of upper and lower cooking units 150, 152 in response to an input from thermistor 352. Oven control panel 110 is coupled to microcomputer 542 for user input and selection of cooking times, commands, algorithms, and oven features.

Thermistor 352 is a device having an electrical resistance that varies with temperature. Once a temperature/resistance relationship is established for a particular thermistor 352, a temperature of thermistor 352 may be easily determined by monitoring its electrical resistance using known techniques in the art, such as for example, with voltage and/or current sensing circuits and devices. Once resistance of thermistor 352 is determined, microcomputer 542 determines a temperature of cooking cavity 122, such as by using a lookup table stored in a memory 544 of microcomputer 542, or by direct calculation or approximation of a mathematical relationship between thermistor temperature and thermistor resistance.

Figure 20:
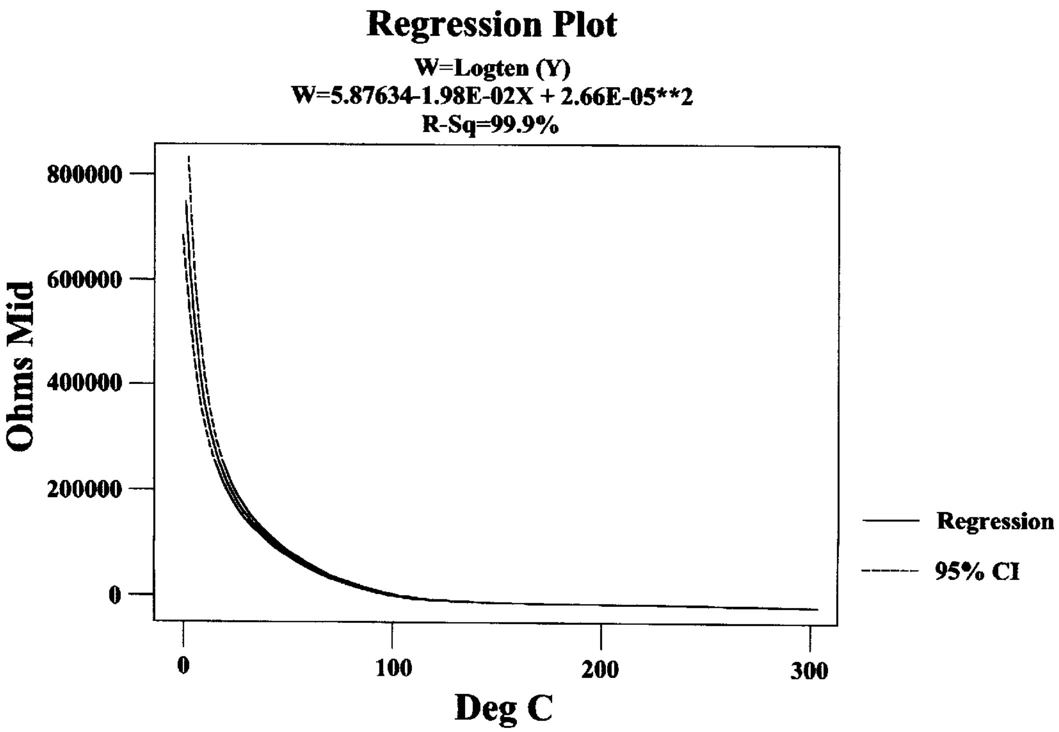
FIG. 20 is an exemplary regression chart for a thermistor used in the thermal compensation system shown in FIG. 19.

FIG. 20 illustrates an exemplary regression plot for an exemplary thermistor 352 that may be used in thermal compensation system 540 (shown in FIG. 19). As can be seen, thermistor 352 has a high sensitivity to temperature ranges between about 0° C. to about 90° C., and particularly from about 50° C. to about 80° C., which has been found to be an appropriate temperature range for thermal compensation system 540.

Figure 21:
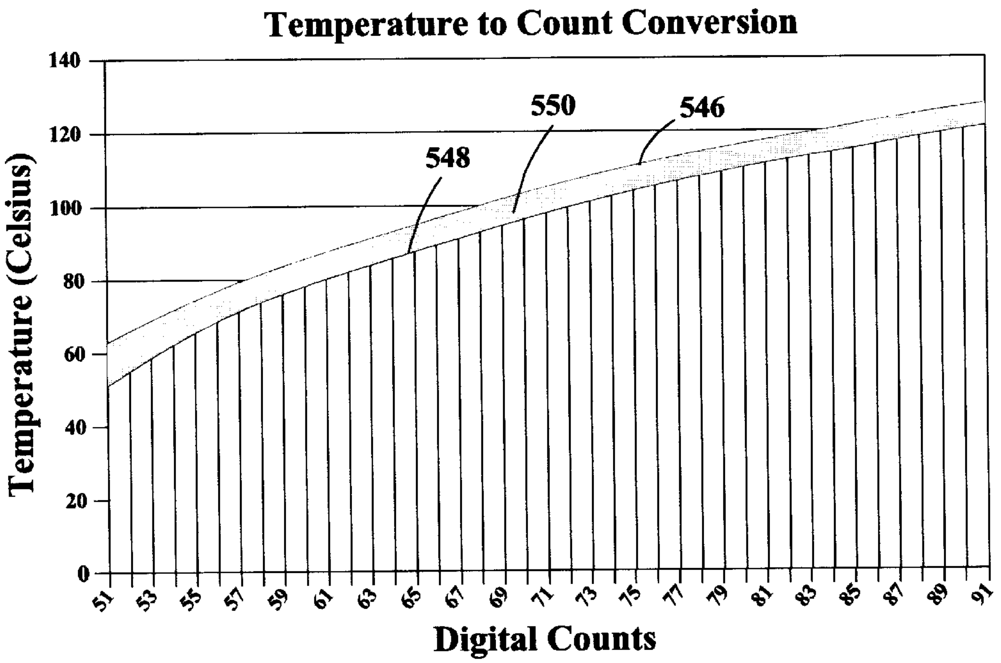
FIG. 21 is a temperature to digital count conversion chart.

In one embodiment, microcomputer 542 (shown in FIG. 19) utilizes a digital control scheme to control upper and lower radiant cooking units 150, 152. To facilitate digital control of cooking units, 150, 152 thermistor temperature is converted to digital counts, such as in the exemplary temperature to count conversation chart illustrated in FIG. 21. An upper curve 546 and a lower curve 548 define an acceptable error band 550 for each digital count. In FIG. 21, for example, a digital count of "51" corresponds to an oven cavity temperature of about 50° C. to about 60° C., and a digital count of "69" corresponds to an oven cavity temperature of about 95° C. to about 100° C. Temperature to count conversion values may be stored in a look-up table in microcomputer memory 544 (shown in FIG. 19), or otherwise approximated or calculated in a number of ways appreciated by those skilled in the art. The digital counts are then used to control respective power levels of upper and lower cooking units 150, 152 (shown in FIG. 19), as further explained below.

Once a temperature of oven cavity 122 has been determined, microcomputer 542 selects a power level adjustment for upper and lower cooking units 150, 152 based upon the corresponding digital count and the selected cooking time input from control panel 110 (shown in FIG. 19). In general, latent heat in oven cooking cavity 122 has a more pronounced effect on cooking quality when cooking time is relatively short, and less of an effect when cooking time is longer because the relative ratio of latent heat energy to radiant energy from cooking units 150, 152 decreases as cooking time increases. The following look-up table illustrates an empirically derived exemplary control scheme to adjust power levels of upper and lower cooking units 150, 152 in response to oven cavity temperature prior to, or proximal with, energization of upper and lower cooking units 150, 152 to begin a cooking operation.

| Cook Time | | | | Power Level Reduction (Counts) | | | | | |
|---|---|---|---|---|---|---|---|---|---|
| From | | To | | Upper | | | Lower | | |
| (Min) | (Sec) | (Min) | (Sec) | 1 | 2 | 3 | 1 | 2 | 3 |
| 2 | 0 | 2 | 44 | 51 | 55 | 59 | 54 | 59 | 80 |
| 2 | 45 | 3 | 44 | 51 | 55 | 59 | 52 | 56 | 57 |
| 3 | 45 | 5 | 14 | 51 | 55 | — | 54 | 64 | — |
| 5 | 15 | 5 | 59 | 51 | 67 | — | 55 | — | — |
| 6 | 0 | 7 | 29 | 51 | — | — | 57 | — | — |
| 7 | 30 | 9 | 14 | 53 | — | — | 62 | — | — |
| 9 | 15 | 10 | 14 | 56 | — | — | 67 | — | — |
| 10 | 15 | 11 | 14 | 65 | — | — | 80 | — | — |

Oven cavity temperature, in one embodiment, is determined in a fixed time period prior to cooking operations. The fixed time period adequately allows for reading of an input from thermistor 352, conversion of the thermistor input to a digital count, and lookup of corresponding power level reduction values, and further is dependent on processor speed of microcomputer 542. Therefore, upper and lower cooking units 150, 152 are energized proximally, or nearly contemporaneously with the temperature reading for best cooking results. However, it is contemplated that a variety of time delays or time periods of different duration between oven cavity temperature reading and cooking operations could be employed within the scope of the invention.

Thus, for a cooking time range between 2 min., 0 sec., and 2 min., 44 sec., a power level of upper unit 150 is unadjusted if the thermistor count is below "51 ," the power level of upper unit 150 is reduced by one power level if the thermistor count is "51" to "54," the power level of upper unit 150 is reduced by two power levels if the thermistor count is "55" to "58," and the power level of the upper unit 150 is reduced by three power levels if the thermistor count is "59" or greater. Likewise, for a cooking time range between 2 min., 0 sec., and 2 min., 44 sec., a power level of lower unit 152 is unadjusted if the thermistor count is below "54," the power level of lower unit 152 is reduced by one power level if the thermistor count is "54" to "58," the power level of lower unit 152 is reduced by two power levels if the thermistor count is "59" to "79," and the power level of lower unit 152 is reduced by three power levels if the thermistor count is "80" or greater.

As an example, a cooking time of 4 min., 30 sec. is selected for execution by microcomputer 542, and a thermistor count of "51" is found to represent a temperature of cooking cavity 122 just prior to execution of a selected cooking algorithm. Since the selected cook time of 4 min., 30 sec. falls in the third row of the table, microcomputer 542 accordingly reduces the power level of upper radiant cooking unit 150 by one level, and does not adjust the power level of lower cooking unit 152 because the threshold value thermistor count of "54" has not been reached. In the same cooking time range, if the thermistor count is "55," microcomputer 542 reduces the power level of upper radiant cooking unit 150 by two levels, and reduces the power level of lower cooking unit 152 by one level.

In one embodiment of the invention, cooking algorithms are executed by microcomputer 542 according to predefined power levels, and thermal compensation system 540 adjusts the pre-selected power levels accordingly to account for latent heat in oven cavity 122 prior to cooking operation. In a further embodiment, the power level of upper and lower cooking units 150, 152, respectively, is not reduced below a minimum threshold power level, such as, for example, a level "2" out of "10" available power levels. For example, a cooking unit power level of "3" could be reduced to "2," but not to "1," and the power level of a lamp that is to function at either power level "1" or "2" would not be reduced at all. Prohibiting power reduction beyond a minimum level facilitates detection of non-functioning cooking lamps by preventing power adjustment at low levels that would appear to turn off the lamps. Thus, potential confusion between inoperable lamps and lamps operating at reduced power levels is avoided because the lamps are energized to at least a minimum threshold power level by thermal compensation system 540.

When voltage compensation is active and time adjustment algorithm 520 (shown in FIG. 18) is utilized to adjust cooking time to compensate for variance in input voltage to oven 100, the adjusted cooking time is used in the thermal compensation control scheme described above. In other words, voltage compensation is performed before thermal compensation to ensure the accuracy of the cooking adjustments.

Figure 22:
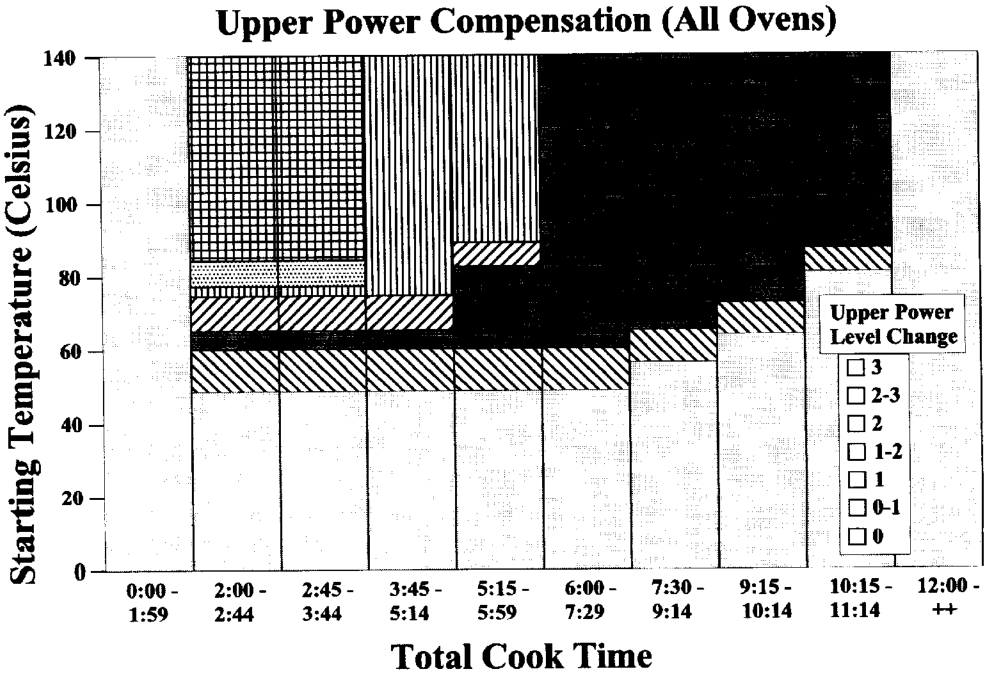
FIG. 22 is a summary chart of a thermal compensation control scheme for an upper cooking unit.
Figure 23:
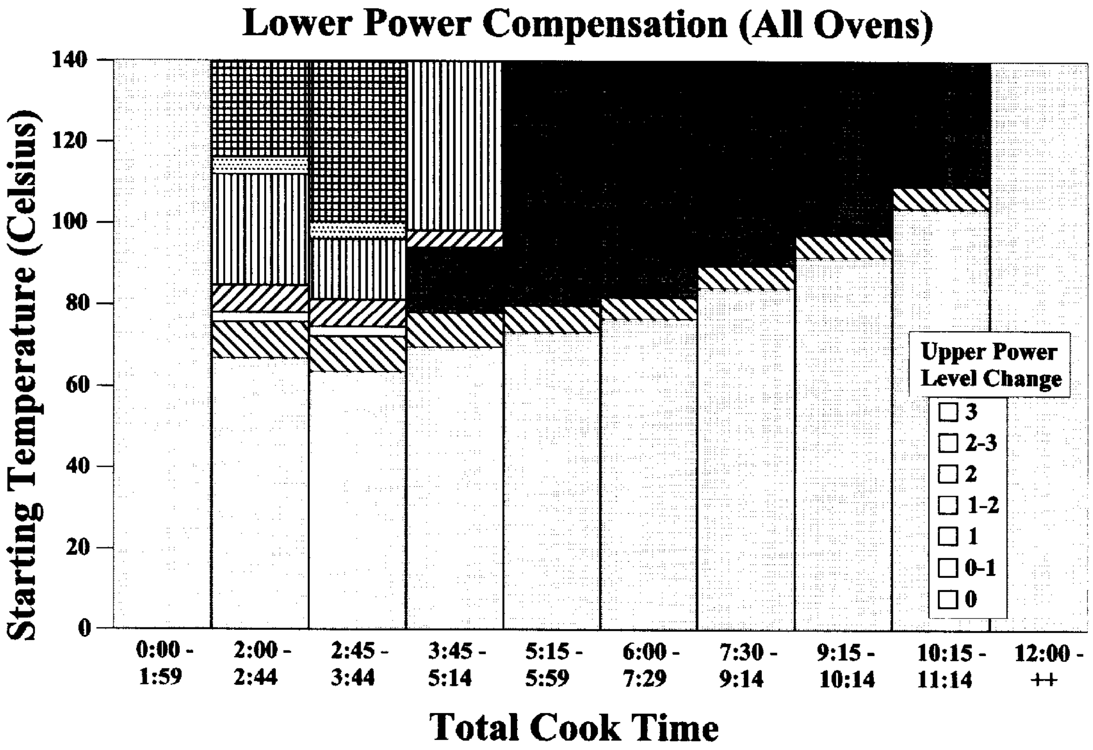
FIG. 23 is a summary chart of a thermal compensation control scheme for a lower cooking unit.

FIGS. 22 and 23 are summary tables of an exemplary thermal compensation scheme for upper and lower cooking units, 150, 152 respectively that may be used to control upper and lower cooking units 150, 152 without converting the temperature to a digital count. Intermediate power level changes, e.g., a power level change of "2–3" reflect observed tolerance bands due to accumulation of errors in thermal compensation system components. For example, and referring to FIG. 22, in a cooking time range of 2 min., 0 sec. to 2 min., 44 sec. the power level of upper cooking unit 150 was observed to be reduced either two or three power levels when the temperature of oven cavity is about 80° C., depending on the accumulation of error in thermal compensation system components.

While the invention has been described in terms of various specific embodiments, those skilled in the art will recognize that the invention can be practiced with modification within the spirit and scope of the claims.

What is claimed is:

1. A method for operating an oven to compensate for thermal conditions of the oven prior to cooking operation, the oven including an oven cavity, at least one upper radiant cooking unit and at least one lower radiant cooking unit for cooking food within the oven cavity when energized for a selected time period, at least one thermistor in thermal communication with the oven cavity for monitoring a temperature thereof, and a control panel operatively connected to the radiant cooking unit for user selection of a cooking time, said method comprising the steps of:

determining the temperature of the oven cavity with the thermistor prior to energizing the cooking units in a cooking operation; and adjusting the operation of the at least one upper radiant cooking unit relative to the at least one lower radiant cooking unit to compensate for the determined temperature so that the at least one lower radiant cooking unit is energized for a greater period of time than the at least one upper radiant cooking unit.

2. A method in accordance with claim 1 wherein said step of adjusting the operation of the at least one upper radiant cooking unit comprises the step of reducing the selected time period of energization of the at least one upper radiant cooking unit when the determined temperature exceeds a first threshold.

3. A method in accordance with claim 1 wherein the at least one of the upper radiant cooking unit and the lower radiant cooking unit includes a first heating element and a second heating element, said method further comprising the step of operating the first heating element and the second heating element so that the first heating element is energized for a greater period of time than the second heating element.

4. A method in accordance with claim 2 wherein the first threshold is about 50° C.

5. A method in accordance with claim 3 further comprising the step of adjusting the operation of the at least one lower radiant cooking unit to compensate for the determined temperature.

6. A method in accordance with claim 5 wherein said step of adjusting the operation of the at least one lower radiant cooking unit comprises the step of reducing the selected time period of energization of the lower radiant cooking unit when the determined temperature exceeds a second threshold.

7. A method in accordance with claim 6 wherein the second threshold is greater than the first threshold.

8. A method in accordance with claim 1 wherein said step of adjusting the operation of the at least one upper radiant cooking unit comprises the step of adjusting the operation of the at least one upper radiant cooking unit based upon the selected cooking time.

9. A method in accordance with claim 8 further comprising the step of adjusting the operation of the upper radiant cooking unit only if the selected cooking time exceeds a minimum cook time.

10. A method in accordance with claim 9 wherein the minimum cook time is about two minutes.

11. An oven comprising:

a cooking cavity;

a microcomputer;

at least one upper radiant cooking unit and at least one lower radiant cooking unit for delivering radiant energy to said cooking cavity, each of said upper radiant cooking unit and said lower radiant cooking unit operatively connected to said microcomputer; and a thermistor in thermal communication with the cooking cavity for determining a temperature thereof and coupled to said microcomputer, said microcomputer operating said at least one upper radiant cooking unit and said at least one lower radiant cooking unit in accordance with a selected cooking time and selected cooking power level and adjusting operation of the upper radiant cooking unit when the determined temperature exceeds a first threshold prior to energizing said upper radiant cooking unit and at least one lower radiant cooking unit in a cooking operation, and so that the at least one lower radiant cooking unit is energized for a greater period of time than the at least one upper radiant cooking unit.

12. An oven in accordance with claim 11 wherein the first threshold is about 50° C.

13. An oven in accordance with claim 11 wherein at least one of said upper radiant cooking unit and said lower radiant cooking unit comprises a first heating element and a second heating element, said microcomputer programmed to operate the first heating element and the second heating element so that the first heating element is energized for a greater period of time than the second heating element.

14. An oven in accordance with claim 11 wherein said microcomputer is further programmed to adjust operation of said at least one lower radiant cooking unit when the determined temperature exceeds a second threshold prior to a cooking operation.

15. An oven in accordance with claim 14 wherein said second threshold is greater than said first threshold.

16. An oven in accordance with claim 11 wherein said microcomputer comprises a memory, said memory loaded with a look-up table containing radiant cooking unit adjustment values, said microcomputer programmed to select a reduced power level for said upper radiant cooking unit from said look-up table based upon the determined temperature and a selected cook time.

17. An oven in accordance with claim 11 further comprising a microwave cooking unit for delivering microwave energy to said cooking cavity and operatively connected to the microcomputer, said microcomputer operating said microwave cooking unit and at least of said upper and lower radiant cooking units in accordance with a selected cooking time and selected cooking power levels for the respective cooking units.

18. An oven in accordance with claim 11 wherein said microprocessor is programmed to energize at least one of said upper and lower radiant cooking units to at least a minimum threshold level.

19. A combination microwave/radiant oven comprising:

a cooking cavity;

a microcomputer;

a thermistor in thermal communication with said cooking cavity for determining a temperature thereof and coupled to said microcomputer;

a microwave cooking unit for delivering microwave energy to said cooking cavity and operatively connected to the microcomputer;

at least one upper radiant cooking unit and at least one lower radiant cooking unit for delivering radiant energy to said cooking cavity, each of said upper and lower radiant cooking units operatively connected to the microcomputer;

a control panel operatively coupled to said microcomputer for accepting a user selected cooking time input and selected cooking power levels for the respective cooking units;

said microcomputer operating said microwave cooking unit and said at least one of said upper and lower radiant cooking units in accordance with said user selected cooking time and power levels; and said microcomputer programmed to adjust operation of said at least one upper radiant cooking unit when a temperature of said cooking cavity exceeds a first threshold prior to energizing said upper and lower radiant cooking units in a cooking operation so that said at least one lower radiant cooking unit is energized for a greater period of time than said at least one upper radiant cooking unit.

20. An oven in accordance with claim 19 wherein said microcomputer comprises a memory, said memory loaded with a look-up table containing radiant cooking unit adjustment values, said microcomputer programmed to select a reduced power level for said upper radiant cooking unit from a look-up table based upon the determined temperature and a selected cook time.

21. An oven in accordance with claim 20 wherein said first threshold is about 50° C.

22. An oven comprising:

a cooking cavity;

a microcomputer;

at least one radiant cooking unit for delivering radiant energy to said cooking cavity and operatively connected to said microcomputer; and a thermistor in thermal communication with the cooking cavity for determining a temperature thereof and coupled to said microcomputer, said microcomputer operating said at least one radiant cooking unit in accordance with a selected cooking time and selected cooking power level and adjusting operation of the radiant cooking unit when the determined temperature exceeds a first threshold prior to a cooking operation wherein operation of the at least one radiant cooking unit is adjusted only if the selected cooking time exceeds a minimum cook time.

23. A method for operating an oven to compensate for thermal conditions of the oven prior to cooking operation, the oven including an oven cavity, a first radiant cooking unit and a second radiant cooking unit for cooking food within the oven cavity when energized for a selected time period, at least one thermistor in thermal communication with the oven cavity for monitoring a temperature thereof, and a control panel operatively connected to the radiant cooking unit for user selection of a cooking time, said method comprising the steps of:

determining the temperature of the oven cavity with the thermistor prior to entering a cooking mode;

adjusting the operation of one of the first and second radiant cooking units relative to the other radiant cooking unit when the determined temperature exceeds a first threshold so that the first and second radiant cooking units are energized for unequal time periods; and adjusting the other of the first and second radiant cooking units when the determined temperature exceeds a second threshold, the second threshold greater than the first threshold.

* * * * *